US007451190B2

(12) United States Patent
Szeto

(10) Patent No.: US 7,451,190 B2
(45) Date of Patent: Nov. 11, 2008

(54) ASSOCIATING MULTIPLE VISIBILITY PROFILES WITH A USER OF A REAL-TIME COMMUNICATION SYSTEM

(75) Inventor: Christopher Szeto, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 814 days.

(21) Appl. No.: 10/754,903

(22) Filed: Jan. 9, 2004

(65) Prior Publication Data

US 2005/0114783 A1 May 26, 2005

Related U.S. Application Data

(60) Provisional application No. 60/525,428, filed on Nov. 26, 2003.

(51) Int. Cl.
*G06F 15/16* (2006.01)
*G06F 15/173* (2006.01)
*G06F 15/177* (2006.01)

(52) U.S. Cl. ....................... 709/207; 709/206; 709/217; 718/107; 715/752

(58) Field of Classification Search ................. 718/107; 709/200–203, 204–206, 207, 217–228; 715/752, 715/706; 370/352
See application file for complete search history.

(56) References Cited

U.S. PATENT DOCUMENTS 4,819,191 A 4/1989 Scully et al.
5,220,657 A 6/1993 Bly et al.
5,767,848 A 6/1998 Matsuzaki et al.
5,822,123 A 10/1998 Davis et al.

(Continued)

FOREIGN PATENT DOCUMENTS

WO WO 00/69140 11/2000

(Continued)

OTHER PUBLICATIONS

Patenet Cooperation Treaty, "Notification Concerning Transmittal of Copy of International Preliminary Report on Patentability (Chapter I of the Patent Cooperation Treaty," PCT/US2004/038354, dated Jun. 12, 2006, 8 pages.

(Continued)

*Primary Examiner*—Haresh N Patel
(74) *Attorney, Agent, or Firm*—Hickman Palermo Truong & Becker LLP

(57) ABSTRACT

Visibility profiles associated with a substantially real time messaging environment are disclosed. Additionally, techniques for managing visibility profiles are disclosed, which include associating a first visibility profile with a first situation, and associating a second visibility profile with a second situation, A visibility profile indicates a set of friends, of a particular user, that are allowed, or disallowed, to view the particular user as available when the particular user is in the associated situation. A situation refers to one or more of a particular time period that a user is logged in, a particular location of the user, a particular device that the user is currently using, or a particular log-in that the user is currently using. Visibility profiles are used to manage the appearance of a user to other users/friends for communication using applications such as instant messaging, electronic mail, web-based mail programs, or other types of data communication exchange applications.

14 Claims, 11 Drawing Sheets

U.S. PATENT DOCUMENTS

| | | | | |
|---|---|---|---|---|
| 5,877,759 | A | 3/1999 | Bauer | |
| 5,880,731 | A | 3/1999 | Liles et al. | |
| 6,237,025 | B1 | 5/2001 | Ludwig et al. | |
| 6,301,609 | B1 | 10/2001 | Aravamudan et al. | |
| 6,380,959 | B1 | 4/2002 | Wang et al. | |
| 6,430,602 | B1 | 8/2002 | Kay et al. | |
| 6,487,583 | B1 | 11/2002 | Harvey et al. | |
| 6,493,724 | B1 | 12/2002 | Cusack et al. | |
| 6,539,421 | B1 | 3/2003 | Appleman et al. | |
| 6,564,246 | B1 | 5/2003 | Varma et al. | |
| 6,564,249 | B2 | 5/2003 | Shiigi | |
| 6,611,814 | B1 | 8/2003 | Lee et al. | |
| 6,614,450 | B1 | 9/2003 | Vossler | |
| 6,640,230 | B1 | 10/2003 | Alexander et al. | |
| 6,651,053 | B1 | 11/2003 | Rothschild | |
| 6,677,976 | B2 | 1/2004 | Parker et al. | |
| 6,747,970 | B1 | 6/2004 | Lamb et al. | |
| 6,760,580 | B2 | 7/2004 | Robinson et al. | |
| 6,781,608 | B1 | 8/2004 | Crawford | |
| 6,807,565 | B1 | 10/2004 | Dodrill et al. | |
| 6,816,884 | B1 | 11/2004 | Summers | |
| 6,907,447 | B1 | 6/2005 | Cooperman et al. | |
| 6,980,983 | B2 | 12/2005 | Banerjee et al. | |
| 6,983,370 | B2 | 1/2006 | Eaton et al. | |
| 7,028,262 | B2 | 4/2006 | Estrada et al. | |
| 2002/0143877 | A1 | 10/2002 | Hackbarth et al. | |
| 2003/0028390 | A1 | 2/2003 | Stern et al. | |
| 2003/0041108 | A1 | 2/2003 | Henrick et al. | |
| 2003/0046296 | A1 | 3/2003 | Doss et al. | |
| 2003/0052915 | A1 | 3/2003 | Brown et al. | |
| 2003/0065788 | A1 | 4/2003 | Salomki | |
| 2003/0101235 | A1 | 5/2003 | Zhang | |
| 2003/0117427 | A1 | 6/2003 | Haughawout et al. | |
| 2003/0208545 | A1 | 11/2003 | Eaton et al. | |
| 2003/0224760 | A1 | 12/2003 | Day | |
| 2004/0117443 | A1 | 6/2004 | Barsness | |
| 2004/0133638 | A1 | 7/2004 | Doss et al. | |
| 2004/0154022 | A1 | 8/2004 | Boss et al. | |
| 2004/0162879 | A1 | 8/2004 | Arcuri et al. | |
| 2004/0172455 | A1 | 9/2004 | Green et al. | |
| 2004/0215731 | A1 | 10/2004 | Tzann-en Szeto | |
| 2004/0243547 | A1 | 12/2004 | Chhatrapati et al. | |
| 2005/0039134 | A1 * | 2/2005 | Wiggeshoff et al. | 715/752 |
| 2005/0055648 | A1 | 3/2005 | Dong | |
| 2005/0086211 | A1 | 4/2005 | Mayer | |
| 2005/0160367 | A1 | 7/2005 | Sirota et al. | |
| 2006/0236269 | A1 | 10/2006 | Borna | |

FOREIGN PATENT DOCUMENTS

| | | | |
|---|---|---|---|
| WO | WO 02/073332 | A2 | 9/2002 |
| WO | WO 03/032613 | A1 | 4/2003 |
| WO | WO 03/084258 | A1 | 10/2003 |

OTHER PUBLICATIONS

Current Claims, PCT/US2004/038354, 4 pages.

International Preliminary Examining Authority, "Notification of Transmittal of the International Preliminary Report on Patentability," PCT/US2004/038353, dated Dec. 9, 2005, 10 pages.

International Searching Authority, "Notification of the Transmittal pf the International Search Report and the Written Opinion of the International Searching Authority, or the Declaration," PCT/US04/21209, dated Aug. 9, 2005, 9 pages.

Current Claims, PCT/US04/21209, 5 pages.

International Searching Authority, "Notification of transmittal of the international search report and the written opinion of the international searching authority, or the declaration," International Application No. PCT/US2004/038354, dated Apr. 19, 2005, 13 pages.

Current Claims, PCT/US2004/038354, 3 pages.

Silver, A. et al., "Unified Network Presence Management" Nortel Network Wireline Solutions, 'Online! May 21, 2000, XP002195089 retrieved from the Internet: URL:HTTP://WWW.WOW-COM.COM/MARKET-RESEARCH/DOCUMENTS/LARKINWS2.PDF> ' retrieved on Mar. 28, 2002! pp. 1-6.

Nelson, et al., "Microsoft Outlook 98 At A Glance", Microsoft Press, 1997, pp. 98-115, and 118-126.

Notification of Transmittal of the International Search Report and the Written Opinion of the International Searching Authority, or the Declaration, received in corresponding PCT International application No. PCT/US2004/038353 dated Mar. 29, 2005; 14 pages.

Notification of Transmittal of the International Search Report and the Written Opinion of the International Searching Authority, or the Declaration, received in corresponding PCT International application No. PCT/US2004/039190 dated Mar. 21, 2005, 14 pages.

Nelson et al., "Microsoft Outlook 98 At A Glance", Microsoft Press, 1997, pp. 98-115 and 118-126, Dec. 31, 2008.

Current Claims, PCT/US2004/038354, 4 pages, Jun. 12, 2006.

International Searching Authority, "Notification of transmittal of the international search report and the written opinion of the international searching authority, or the declaration," International Application No. PCT/US2004/038354, dated Apr. 19, 2005, 13 pages.

Current claims, PCT/US2004/038354, 3 pages, Apr. 19, 2005.

Current Claims, PCT/US04/21209, 5 pages, Aug. 9, 2005.

* cited by examiner

| WORK 202 | | HOME 204 | | MOBILE 206 | |
|---|---|---|---|---|---|
| SVL 208 | SIL 210 | SVL 212 | SIL 214 | SVL 216 | SIL 218 |
| Lee | Pat | Jennifer | Lee | Lee | |
| Susan | Joanne | | Susan | Susan | |
| Bill | Jennifer | | Bill | Bill | |
| Diana | | | Diana | Diana | |
| Clover | | | Clover | Clover | |
| Scott | | | Scott | Scott | |
| Terry | | | Terry | Terry | |
| | | | Pat | Pat | |
| | | | Joanne | Joanne | |
| | | | | Jennifer | |

ASSOCIATING MULTIPLE VISIBILITY PROFILES WITH A USER OF A REAL-TIME COMMUNICATION SYSTEM

CROSS REFERENCE TO RELATED APPLICATIONS

This application claims priority to U.S. Provisional Patent Application No. 60/525,428 entitled "VISIBILITY PROFILES" filed Nov. 26, 2003 which is incorporated herein by reference for all purposes.

FIELD OF THE INVENTION

The present invention relates generally to software. More specifically, techniques for providing information associated with a substantially real-time communication system are disclosed.

BACKGROUND OF THE INVENTION

Applications, programs, and other activities that enable users to control and personalize their online activities are useful. However, conventional techniques are often limited in their ability to invoke privacy protections without adversely impacting communications.

Internet and internetworking based technologies such as instant messaging and e-mail are often considered to be personalized communication applications that enable simple, but direct messaging from one user to another or several users. Specialized services such as personal accounts and other forms of tailored communication applications have been developed to meet the growing demand for personalized communication services. However, these services are often limited in features, capabilities, and configurability. Further, conventional techniques are often limited in terms of privacy and accessibility control.

Managing online interaction often involves the use of applications that enable a user to configure her online activities. Such applications can enable a person to establish particular settings that affect privacy, accessibility, and other user attributes. However, these applications can also detrimentally impact the ability of a user to communicate, often stopping or interrupting communication with friends entirely or rendering a communication application (e.g., instant messaging) virtually useless.

Thus, what is needed is a solution for configuring online interactivity without detrimentally affecting communication abilities or user control.

BRIEF DESCRIPTION OF THE DRAWINGS

Various embodiments of the invention are disclosed in the following detailed description and the accompanying drawings.

FIG. 2 illustrates an example of a data structure for implementing a visibility profile;

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1A:
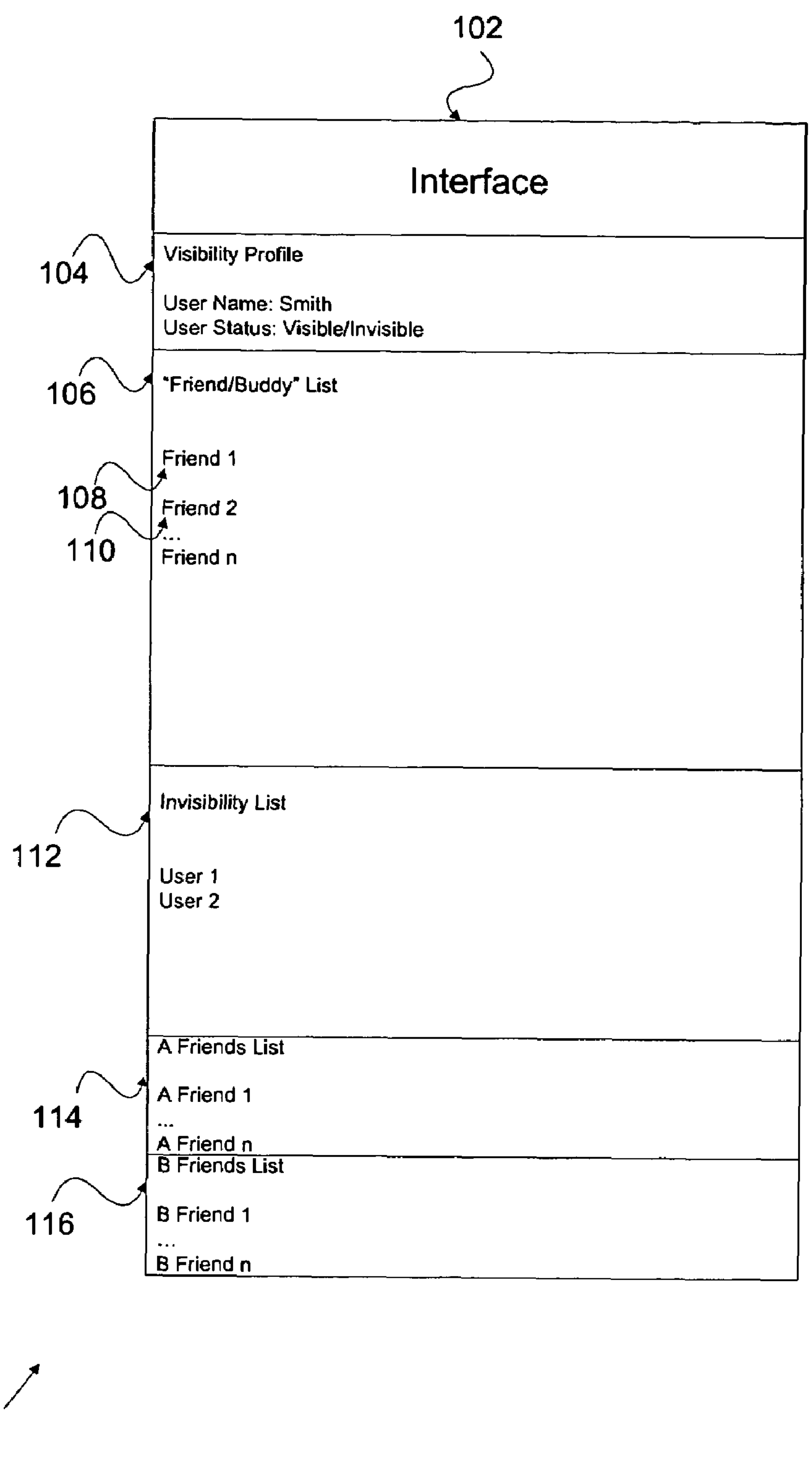
FIG. 1A illustrates an interface display employing visibility profiles, in accordance with one embodiment.

In one embodiment, profiles related to a messaging system are disclosed. FIG. 1A illustrates an interface display 100 employing visibility profiles, in accordance with one embodiment. An interface 102 includes a visibility profile 104, as used herein, which may also include information and configuration settings that can be used to determine how a user appears to other users. For ease of reference, the other users may also be referred to as friends. Friends, as used herein, may include any target that can communicate with the user such as another user or machine. In one embodiment, messages to friends may be sent when the user is either online or visible (i.e., available for communication) or offline and invisible (i.e., unavailable for communication). Visibility profile 104 may also include lists of friends, each of which can be independently configured, categorized, or titled to users who may appear differently, depending upon the user-configurable visibility profile 104 (e.g., visible, invisible, selectively invisible, selectively visible, etc.). These lists may be referred to as "selective invisibility" or "selective visibility" lists, which are described in greater detail below.

In some embodiments, techniques for managing visibility can be associated with various environments, including a substantially real-time environment such as instant messaging, cell phones, etc. Profiles can be associated with situations and with a visibility or invisibility state. For example, in a case involving four profiles, a first profile can be associated with a first situation, a second profile associated with a second situation, a third profile associated with a third situation, and a fourth profile associated with a fourth situation, etc. In general, if a user is at his work machine, a group of friends, such as his family members, can see the user as being on-line and available for messaging, and another group, such as his work associates, can also see him as being on-line, while another group of friends, such as his soccer buddies, sees the user as being off-line. If the user is at his home machine, his family and his soccer buddies can both see him as being on-line and available for messaging but perhaps the user will select his work associates as viewing him as being off-line. If the user is on his cell phone, he can have just his family see him as being available while the other groups see him as being unavailable. The user may also select various profiles for other situations such as by time and location. Once the user selects the various profiles for various groups in various situations, the profiles can be automatically set as a default for the subsequent sessions, depending on which situation the user is in. In this manner, the user can set his preferences for various combination of groups of friends for various situations and have it automatically set each time that situation occurs.

In the example shown in FIG. 1A, interface 102 illustrates a visibility profile 104, which may include the user's name and status (e.g., "I'm available", "I'm unavailable", etc.). Included under visibility profile 104 are several user lists, including friend/buddy list 106 (showing "Friend 1" 108, "Friend 2" 110, up to n number of friends), invisibility list 112 (having "User 1," "User 2," and n number of other users), A friends list 114 (having "A Friend 1" through "A Friend n"), and-B friends list 116 (having "B Friend 1" through "B Friend n"). User lists may be configured based on a variety of factors. Other types of lists may be created to distinguish users based on a particular characteristic or set of characteristics, categorization, or other feature. Some of these lists are discussed below. On friend/buddy list 106, friends 108 and 110 are included. Any number of friends, n, may be included to identify other users who frequently exchange messages with the user. Various users are included as a representative sampling, such as friend 1 108 and friend 2 110, but any number of friends, n, may be included. These other users or friends may see the user as being invisible or visible, depending upon the user's status identified in visibility profile 104. In some embodiments, the status of each user may be represented by icons. For example, a "happy face" may be used to indicate online or available users, whereas a non-happy face might be used to indicate users who are offline or unavailable. Other iconic representations of cell phones, stop signs, traffic signs, and others may be used to provide different types of individual status indicators for users. In other embodiments, text or a combination of text and icons can be used to represent the status of users assigned to lists within a visibility profile. The example shown illustrates how visibility profile 104 may be used in an instant messaging schema. In this example, visibility profile 104 is used to manage various users and interactions with the primary logged-in user identified in visibility profile 104.

Lists may also be used to identify users based on whether the logged-in user intends to show their online presence as either "visible" or "invisible." As shown, an invisibility list 112 may also be employed by a user to identify friends to whom the user appears to be invisible. A user may also decide to be selectively visible or invisible to other users. As used herein, selective visibility refers to the ability of a user to appear online (visible or available) to specific friends when the user is logged in as unavailable or invisible. Selective invisibility refers to the ability to appear offline (invisible or unavailable) to specific friends when the user is logged in as available or visible. Selective visibility and selective invisibility lists may be created to identify specific users to whom the user is visible/invisible, depending upon the profile that the user wishes to implement, which may be performed at log-in or while the user is already logged-in.

As an example, "user 1" is listed on invisibility list 112 (to be discussed in further detail below) and does not see the user, although the other users in friend/buddy list 106 can see the user. The individual handling of users on the selective invisibility list can be configured within visibility profile 104 so that when the user logs in to her account and implements this particular visibility profile, her availability and online appearance to the friends listed under her profile are configured based on the settings identified with that particular profile. The establishment and management of profiles will also be discussed in greater detail below. Lists may be created as desired, enabling categorical groupings of friends that a user may wish to communicate with regarding a particular topic. "A Friends" list 114 and "B Friends" list 116 are examples of such additional lists, each of which may have created to identify other users that have been categorically separated from other users. More or fewer lists may be created, modified, or deleted, in other embodiments.

Figure 1B:
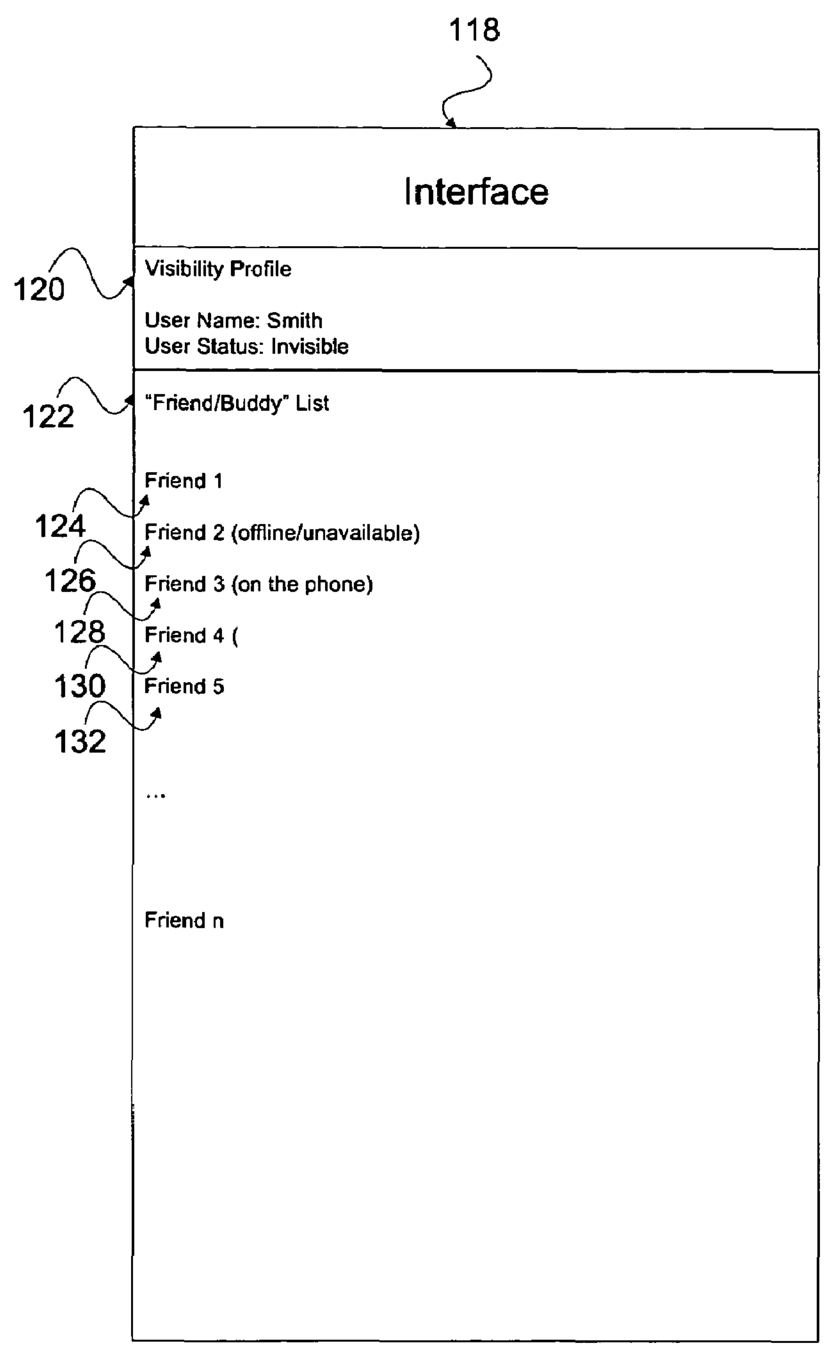
FIG. 1B illustrates an interface display employing visibility profiles in which a user is logged in as invisible, in accordance with one embodiment.

FIG. 1B illustrates an interface display 100 employing visibility profiles in which a user is logged in as invisible, in accordance with one embodiment. This example illustrates an interface 118 for displaying information to enable a user to log-in and use a profile in which he appears invisible to friends. That is, the user appears offline to friends and is intended to discourage the latter from sending messages to the offline or invisible user 120. Here, interface 118 illustrates a visibility profile 120, which includes the user's name (e.g., "Smith") and visibility profile status (e.g., "Invisible") wherein the user appears invisible to friends identified on friend/buddy list 122. The user in this example, "Friend 1" 124 is invisible and, as discussed in connection with FIG. 1, can be represented by an icon to indicate that the user appears invisible to "Friend 1" 124. In an embodiment, a semi-transparent icon is used to show that "Friend 1" 124 has logged in, indicating that he is available for communication, despite the invisible nature of the user. In other embodiments, different icons may be used to also indicate other types of status, features, or characteristics of users identified on friend/buddy list 122 or any other list that may appear on interface display 100. For example, "Friend 2" 126 may also be logged-in, but has indicated that she is unavailable to communicate with the user. In other embodiments, her unavailable status may be represented by an icon such as a stop sign, traffic sign, color, light, highlighting, or by other characters, text, or symbols. In this format, text can be placed to represent to the user that "Friend 3" 128 is on the phone, "Friend 4" 130 is logged off temporarily, and "Friend 5" 132 is busy. Other techniques may be used in other embodiments to also provide friend/buddy status.

Figure 1C:
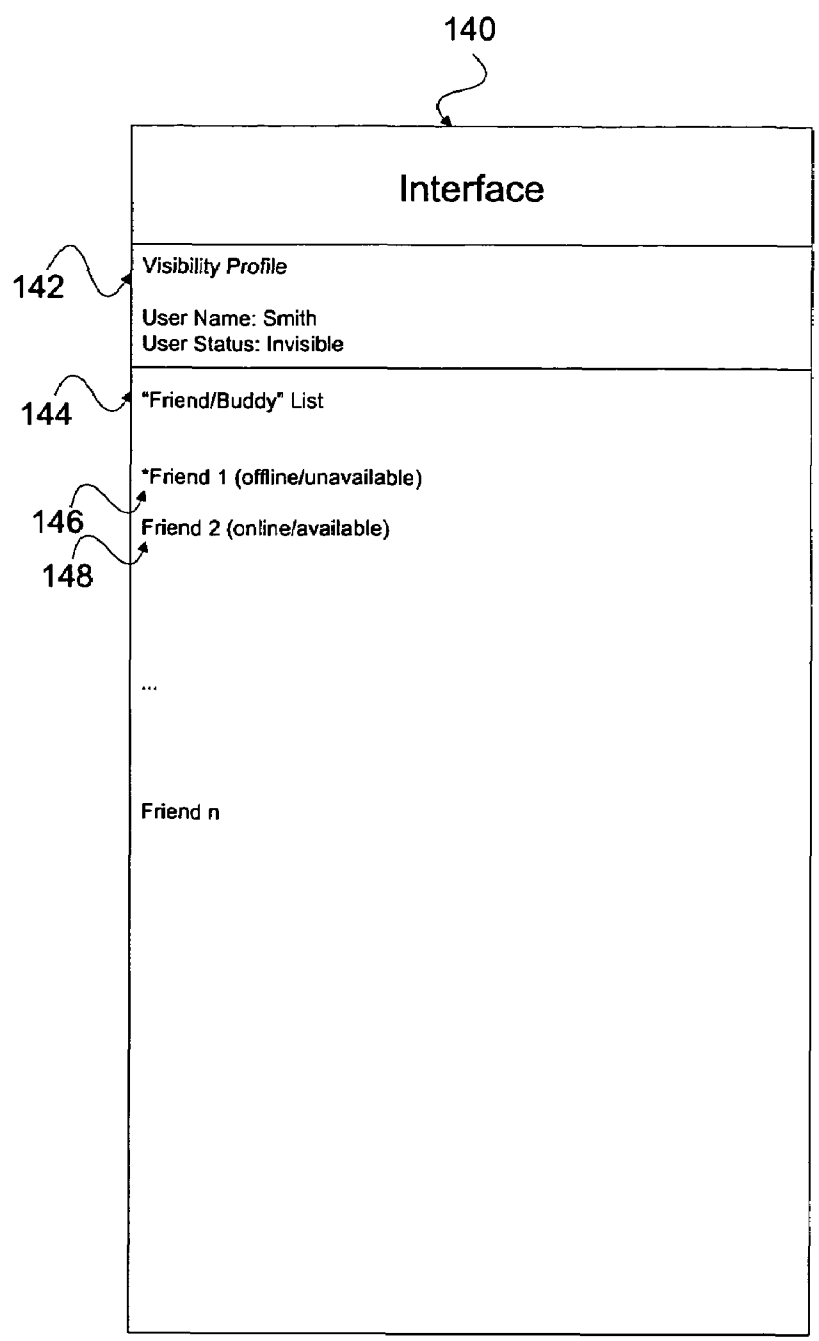
FIG. 1C illustrates an interface employing visibility profiles in which a user is selectively invisible, in accordance with one embodiment.

FIG. 1C illustrates an interface employing visibility profiles in which a user is selectively invisible, in accordance with one embodiment. In this example, a user can configure a visibility profile to provide for individual treatment of friends and to determine how the user appears to friends. Again, a graphical user interface 140 is shown, providing a visibility profile 142, which includes the user's name and visibility profile status. Friend/buddy list 144 identifies users that may or may not be able to view the online presence of a user. For example, star next to the user 146 represents that the user is invisible to user 146. In contrast, user 148 does not have a star indicated and thus the user is visible to user 148. In other embodiments, other icons, symbols, or texts may be used to provide similar functionality. FIG. 1A-1C illustrate an embodiment of how interface displays employing visibility profiles may be used. In other embodiments, different features, characteristics, action buttons, menus, or other types of functionality may be included or removed to implement the visibility profile.

FIG. 2 illustrates an example of a data structure for implementing a visibility profile. In this example, data structure 200 is a table containing various data and information for visibility profiles. Various techniques may be used for implementing data structure 200 including databases, data storage, repositories, and other types of data structures. Data structure 200 includes several columns for identifying and segmenting data. Each of visibility profiles 202-206 identify settings and data related to the configuration of the individual profiles.

Each visibility profile 202-206 may be used for implementing a specific set of configuration settings. For example, visibility profile 202 may be implemented to identify a particular configuration for setting the visibility of a user while at work. In this example, visibility profile 202 can be configured using numerous factors such as type of machine (e.g., desktop, laptop, mobile device, etc.), location (e.g., home, work, traveling, etc.), user (i.e., multiple users may be using the same device, but with different log-ins, multiple profiles can be used on a single device), schedule/time of day, or manually configured by a user. Visibility profiles can be generated based on a variety of other factors beyond those mentioned above. Personalization of visibility profiles provides desirable control and usage aspects to online communication. Within each of visibility profiles 202-206, sub data structures are used for implementing selective invisibility lists (SILs) and selective visibility lists (SVLs). A SVL and SIL are paired together and included under each visibility profile 202-206. For example, a user can have a SVL and SIL assigned to his work profile, which determines friends that can and cannot see the user. Each profile can also have a SVL and SIL that provide independent lists to determine whether to enable the user's presence to be known by another user. In other embodiments additional SVLs or SILs may be included. In this example, work SVL 208 and work SIL 210 identify configuration settings that can be used by a user. In this example, work SVL 208 identifies friends who can see the user when he logs in using this visibility profile or, while logged-in, changes his profile to work visibility profile 202. Work SIL 210 identifies users who cannot see the user when logged-in under work visibility profile 202. Likewise home SVL 212, home SIL 214, mobile SVL 216, and home SIL 218 may be used to implement different selective visibility/invisibility lists.

Figure 3A:
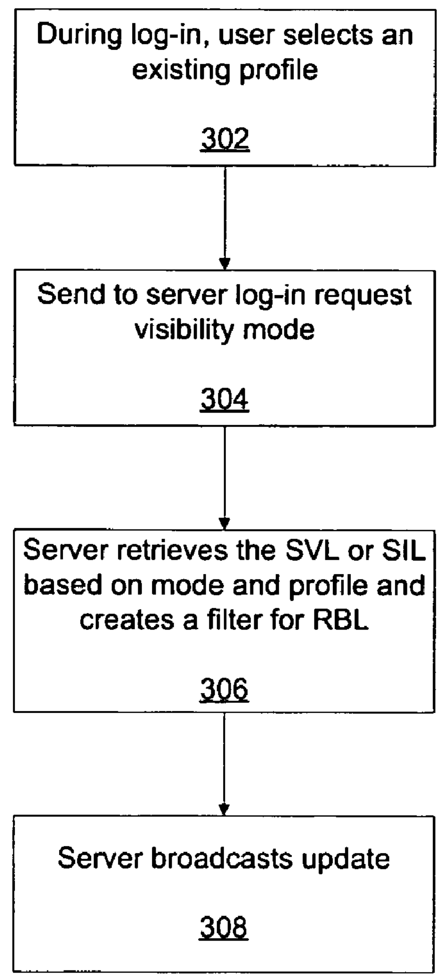
FIG. 3A illustrates a process for managing visibility, in accordance with one embodiment.

FIG. 3A illustrates a process for managing visibility, in accordance with one embodiment. In the example shown, a user selects an existing visibility profile from a list of pre-existing profiles (302). Visibility profiles may be defined based on location, machine, IP address, or any other characteristic that may be envisioned. With the log-in, a request that identifies a particular visibility mode (e.g., visible, invisible, selectively visible, selectively invisible, etc.) is sent to a server, computer, mainframe, or other central computing device (304). In this example, a client-server relationship is used, but in other embodiments other network configurations may be used (e.g., peer-to-peer, mainframe-terminal, etc.).

Upon receipt of the request, a SVL, SIL, or both SVL and SIL can be retrieved based on the mode and visibility profile requested, creating a filter for a "reverse buddy" list (RBL) (306). In this example, RBL may be a list of users/friends who list this user in their individual and respective "friends" lists. Users/friends in the RBL who are online may receive notifications whenever this user logs in, logs off, or changes status. The server uses the SVL and SIL to filter the notifications to the correct subset of users/friends in the RBL. By filtering those users/friends listed on the RBL, this user may configure his visibility profile to continue to allow selected users/friends to see his or her online status, regardless of a current visibility mode (e.g., invisible to all users). Once the necessary information has been retrieved, the server broadcasts an update to the eligible users/friends (308). Other embodiments of the above techniques are described below.

Figure 3B:
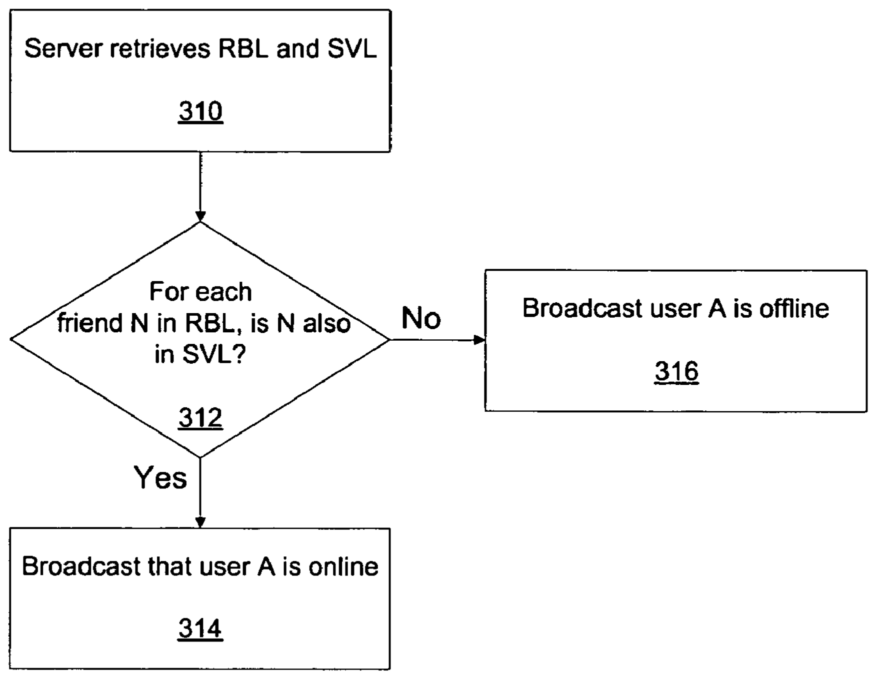
FIG. 3B illustrates a further process for broadcasting an update with a selective visibility list, in accordance with one embodiment.

FIG. 3B illustrates a further process for broadcasting an update with a selective visibility list, in accordance with one embodiment. In this example, a requested RBL and SVL are retrieved, depending upon the visibility profile and mode selected (310). A RBL can be used by a user to identify friends who have listed the former as a "friend" on their respective buddy lists. "Friend" can refer to other users who are identified by a user in a visibility profile, RBL, SVL, SIL, or other list, and are not necessarily a friend by way of relationship to the user. By using a RBL, a user can specify "preferential" treatment of friends who are on his RBL and, possibly, override a visibility profile.

A determination is made to whether each friend, N, listed in the RBL is also listed in the SVL (312). In other embodiments, a friend, N, may be in the RBL and not on the SVL, in which case the friend would receive a broadcast that the user is online. In other words, if a friend, N, is on a user's RBL and SVL, then the friend, N, would receive a broadcast alerting him to the user when the latter initially logs in. In other words, if a friend, N, is listed in the RBL and also in the SVL, then the user's status is broadcast to the friend, N, as online (i.e., available, visible) (314). If a friend, N, is in the RBL, but not in the SVL, then the user's status is broadcast to the friend, N, as offline (i.e., unavailable, invisible) (316).

Figure 3C:
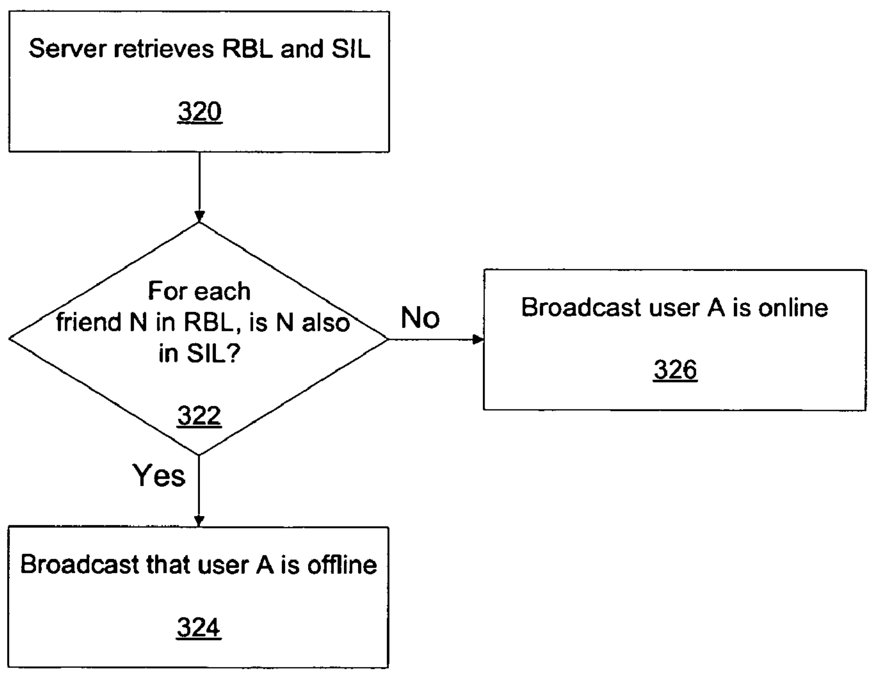
FIG. 3C illustrates a further process for broadcasting an update with a selective invisibility list, in accordance with one embodiment.

FIG. 3C illustrates a further process for broadcasting an update with a selective invisibility list, in accordance with one embodiment. In this example, the RBL and SIL are retrieved, for example, by a server (320). For each friend, N, in the RBL, a determination is made as to whether the friend, N, is also in the SIL (322). If a friend, N, is in both the RBL and the SIL, then a broadcast is made to the friend, N, that the user is offline (324). If a friend, N, is in the RBL, but not in the SIL, then a broadcast is made to the friend, N, that the user is online (326).

Figure 4:
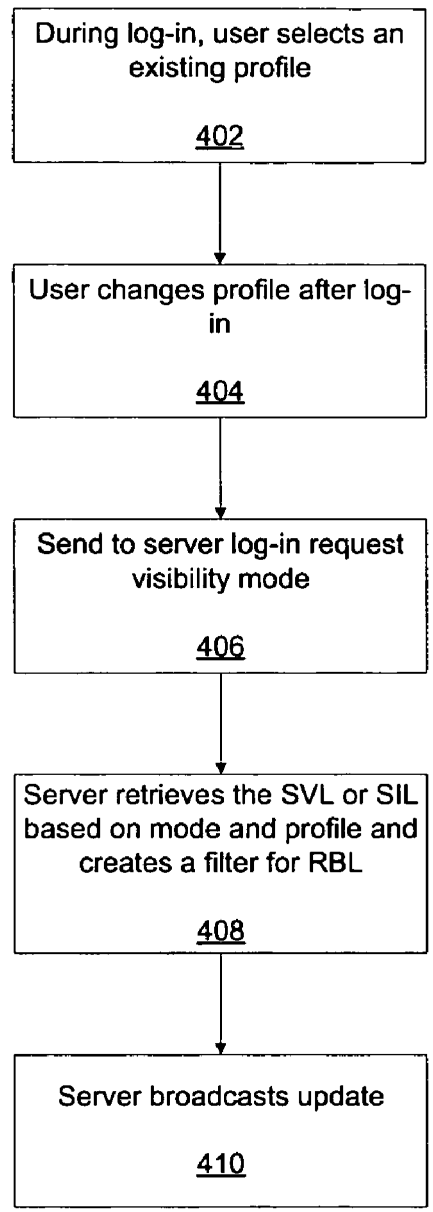
FIG. 4 illustrates a process for changing a visibility profile, in accordance with one embodiment.

FIG. 4 illustrates a process for changing a visibility profile, in accordance with one embodiment. In this example, a user can change or modify a visibility profile. Upon log-in, a user selects an existing visibility profile, which may be either a selective visibility or selective invisibility profile (402). The user changes the profile, which will be explained in greater detail below (404). A log-in request is sent, for example, to a server, requesting a visibility mode (406). If a visibility mode has not been established, a default mode may be sent. Default visibility modes may include treating all users as though the user is online (i.e., broadcast to all users that the user is online). Other default modes may include treating all users as though the user is offline or invisible. This mode may be useful in a mobile device environment where a user wishes to avoid having numerous users detect his online presence and, subsequently, receive several messages and incur increased air time charges. In this example, treating all users as though the user is invisible or unavailable enables the user to selectively choose friends to whom his online presence is revealed.

In other examples, a default mode may be specified when the user logs in at a certain time of day, thus implying a default mode for home and work use. Once the SVL or SIL is retrieved, depending upon the mode and profile identified during log in, a filter is created and run against the RBL (408). At the server, database, or other data repository where the user's visibility profile is stored, the filter can be an ad hoc or structure query that, based on select criteria, searches the SVL or SIL and the RBL for entries that match the search criteria. The search results (i.e., users who are on the RBL and SVL, etc.) produce a subset of users who are then identified to receive or not receive a broadcast as to the user's online presence. Users who are on the RBL can be updated as to the current status of the user. Determining whether to retrieve a SVL or SIL depends upon how a visibility profile is configured. If a user configures his visibility profile to be "selectively invisible," then a SIL is used. If a user's visibility profile specifies that the user is "selectively visible," then a SVL is used. Either an SVL or SIL can be used with an RBL to determine friends that are notified or not notified via a broadcast that a user is online/offline. Regardless, an update is broadcast to the users using the process described above (410).

Changing or modifying a visibility profile includes a variety of functions, which are not necessarily limited to those mentioned herein. Functions such as changing the users on the SVL, SIL, or both lists may be performed using the above-described process. Other functions may include visibility profile configuration, location, machine, or other setting changes.

Changes based on location and machine may also include identifying the specific machine or device that the user logs in to use, thus implementing a machine or device-specific visibility profile. For example, in the case of a mobile device such as a cell phone or personal digital assistant (PDA), when a user logs-in, a specific visibility profile may be implemented that identifies a discrete set of users who may see the user as being "available" or visible. This may be useful and appealing to users who pay air-time usage charges for mobile device communication services. In other words, a mobile device user may wish to restrict the number of friends who can view the user as available or visible. In another example, a laptop user may also require changes to a visibility profile.

A user may log on to a laptop computer, which may be connected to and disconnected from various networks, using various and configurable visibility profiles. In the example of a laptop, a user can configure a visibility profile that is invoked when a user logs in while connected to a home network. However, when the user's laptop is connected to a LAN, for example, at his place of business, a different visibility profile may be invoked, one in which he is broadcast as being visible to his co-workers. In still others, a visibility mode may be specified where a user is not connected to any network but, for example, using a wireless communication media while sitting in a park. In this example, which is similar to that of a mobile device such as a cell phone where a user wishes to appear as offline or selectively invisible to all friends, so as to avoid data traffic congestion or increased air time usage charges from friends. Other visibility profiles for use with a laptop may be configured in accordance with examples given earlier (e.g., time, user, machine, location, etc.) and are not limited to those examples presented. Visibility profiles may be configured to implement a particular group of settings when the user logs in while connected to his home network and, for all other networks, a different group of settings. In other words, a user can identify specific users that he wants to appear available to, but condition based on the location of his mobile device. Visibility profiles may be configured in other embodiments based on various characteristics other than those mentioned above. Other functions for configuring a visibility profile are discussed below in connection with FIGS. 5-7.

Figure 5A:
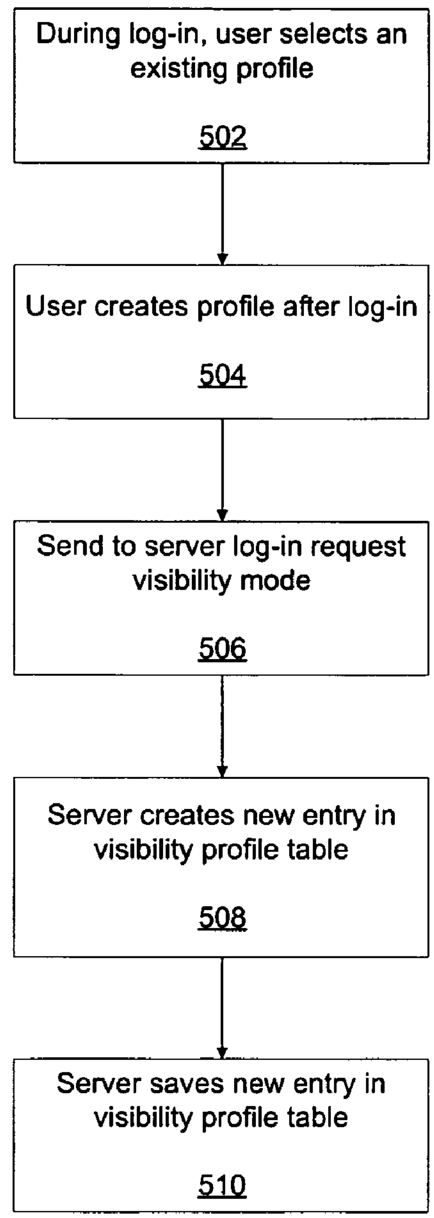
FIG. 5A illustrates a process for creating a visibility profile, in accordance with one embodiment.

FIG. 5A illustrates a process for creating a visibility profile, in accordance with one embodiment. In this example, similar to the above-mentioned processes, during log-in a user selects an existing visibility profile (502). In other examples, a user may be able to configure, select, or create a visibility profile without logging in using, say, an administration website or screen that does not invoke a visibility profile. A user is permitted to log-in to his/her existing account, which may contain one or more visibility profiles. A user can create a new visibility profile (504). A create visibility profile request is sent to a server with a request (506). The request is processed, which includes creating a new entry in a visibility profile data structure, such as the table 200 in FIG. 2 (508). Once created, the user can save the newly created profile (510). Although not shown, a user may be prompted to immediately implement the newly-created visibility profile or save it for later implementation. Regardless, when a user logs out of his account, the current visibility profile is saved and re-implemented when the user logs back in. In another embodiment, the user may preferably log out of his account on one machine, thus saving a visibility profile and later log in to another machine, and have the last saved visibility profile reinstituted. The portability of using visibility profiles provides a consistent and reliable feature for users to manage their online presence.

Figure 5B:
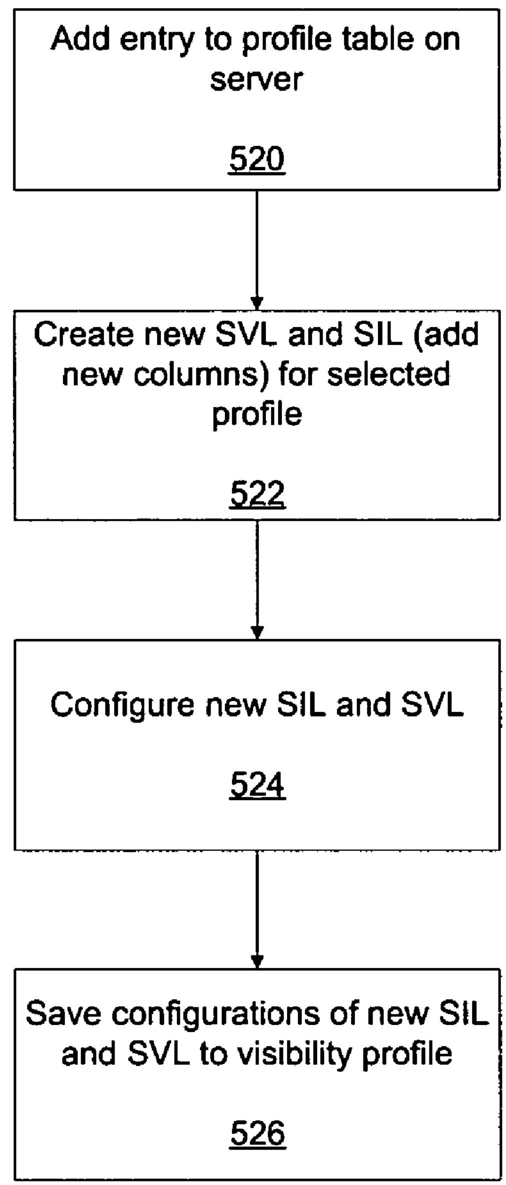
FIG. 5B illustrates a further process for creating a visibility profile, in accordance with one embodiment.

FIG. 5B illustrates a further process for creating a visibility profile, in accordance with one embodiment. In this example, when a visibility profile is created, a new entry is added to a visibility profile data structure, such as a table (520). The table may be kept on the server, computer, or other data storage and processing device. Once the new entry for a new visibility profile is created, then new columns for a new SVL and SIL are also added to the new entry (522). The new SVL and SIL can be configured depending upon user preferences or other criteria, manual or automated (524). Once configured, the changes are saved to the server, whereupon the new visibility profile can be implemented by a user (526).

Figure 6:
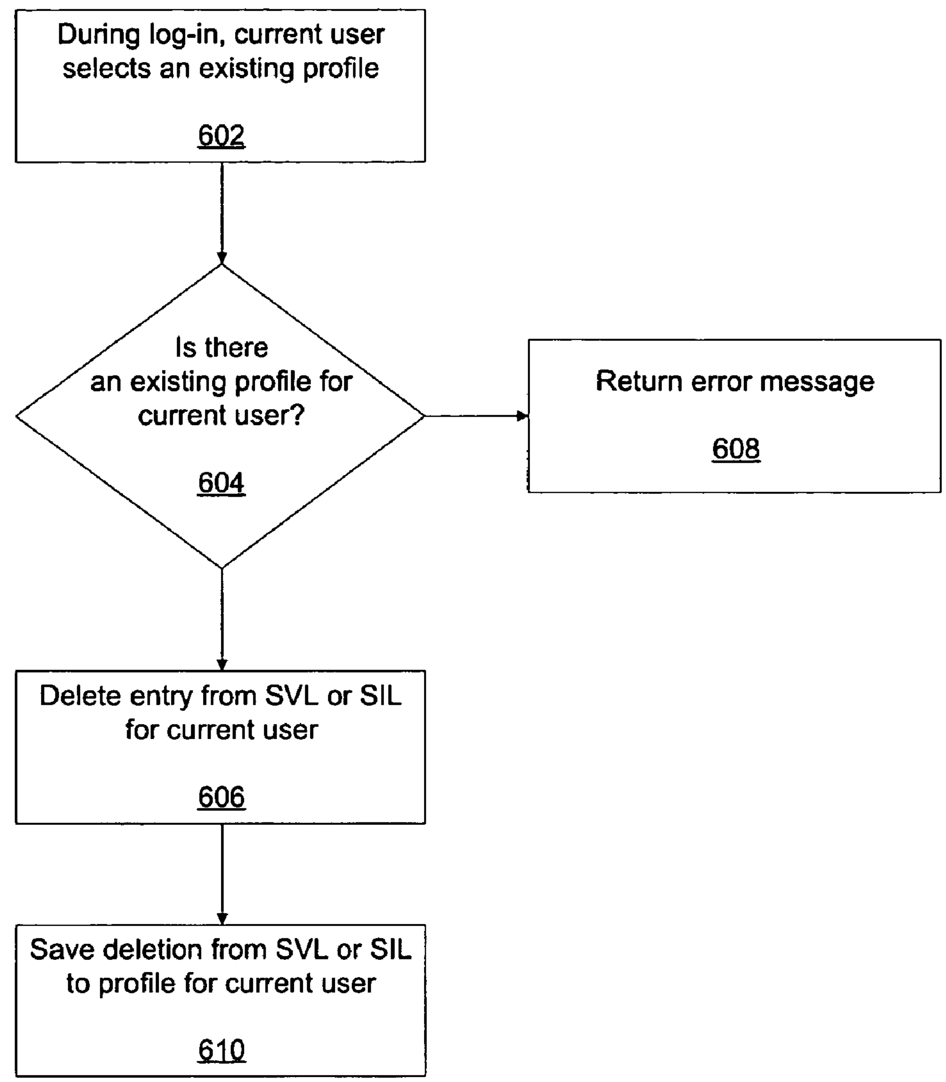
FIG. 6 illustrates a process for deleting a visibility profile, in accordance with one embodiment.

FIG. 6 illustrates a process for deleting a visibility profile, in accordance with one embodiment. In this example, a user logs in to her account, which may contain one or more visibility profiles (602). Upon log-in, the server determines whether there is an existing visibility profile for the user (604). If at least one visibility profile exists, then the user can select a user from a list for deletion, which, in turn, causes the deletion of an entry from the SVL, SIL or both (606). If the current user does not have at least one existing visibility profile, then an error message is returned (608). In other embodiments, if a user does not have an existing visibility profile, a prompt may be given to create a visibility profile.

However, if at least one visibility profile exists, then, after the desired entry is deleted, the deletion is saved to the visibility profile for the current user (610). In other embodiments, this process may be reiterated until the user logs out or selects another action besides deletion of a visibility profile or an entry within an existing visibility profile.

Figure 7:
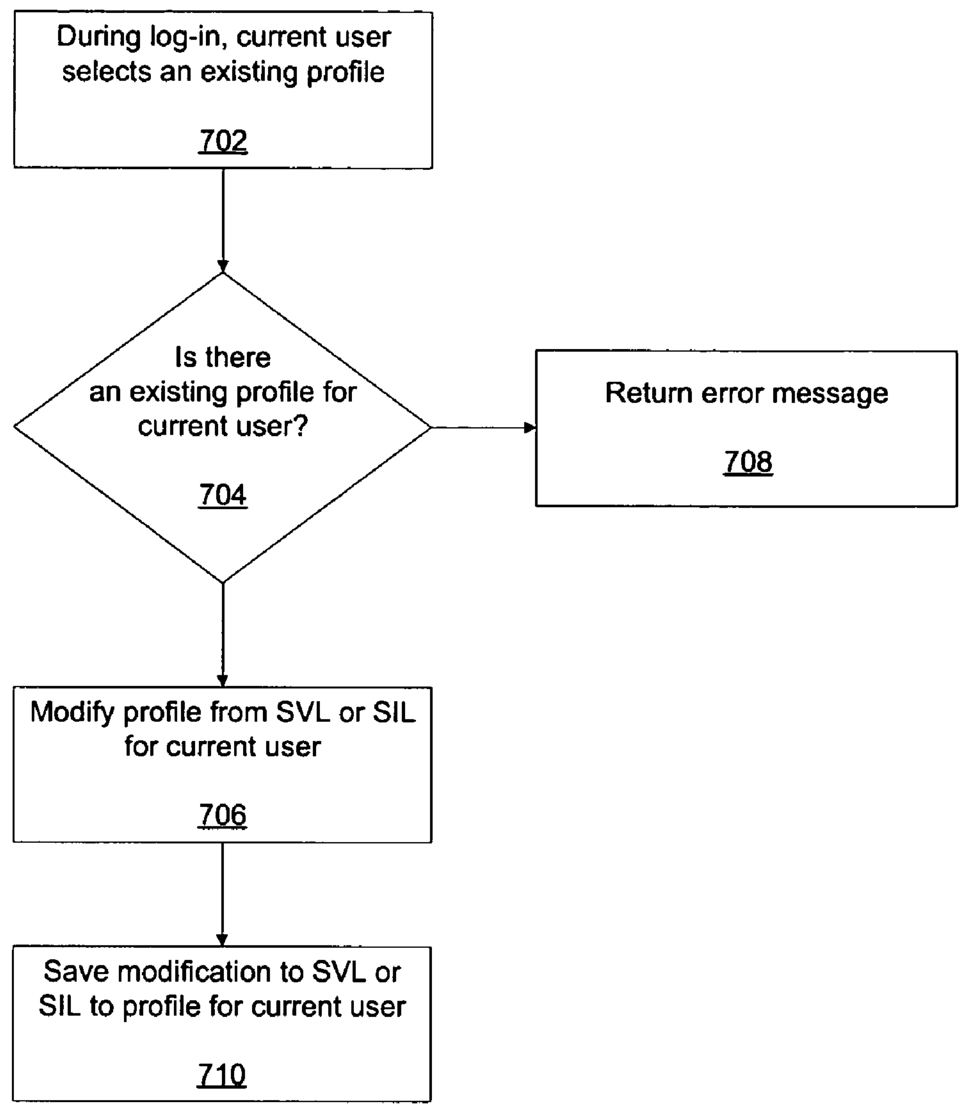
FIG. 7 illustrates a process for modifying and saving a visibility profile, in accordance with one embodiment.

FIG. 7 illustrates a process for modifying and saving a visibility profile, in accordance with one embodiment. In this example, a user selects an existing visibility profile (702). During the log-in process, the determination is made as to whether an existing visibility profile is available (704). If a visibility profile is available, then the SVL or SIL can be modified for the selected visibility profile (706). Modifications may include changing users listed in the SVL or SIL, changing rules that govern the implementation of a particular visibility profile, etc. If there is no existing visibility profile for the user logging in to her account, then an error message is returned (708). In other embodiments, the user may be prompted to create a new visibility profile. Once modifications are complete, the user can direct the server to save the modifications (710). The user may elect to save the modifications from either a command button on an interface (e.g., interfaces 102, 118, 140) or from a menu of options. Other user actions such as those discussed above (e.g., creation, deletion, changing visibility profile settings, etc.) may also be implemented using command buttons or menus.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing visibility of a particular user in a real time messaging environment, comprising:

associating a first visibility profile, of the particular user, with a first situation;

associating a second visibility profile, of the particular user, with a second situation;

when the particular user is in the first situation, determining, based on the first visibility profile, a first set of one or more users that are allowed, or disallowed, to view the particular user as available to communicate, wherein the first visibility profile identifies the first set of one or more users;

when the particular user is in the second situation, determining, based on the second visibility profile, a second set of one or more users that are allowed, or disallowed, to view the particular user as available to communicate, wherein the second visibility profile identifies the second set of one or more users;

wherein the first situation indicates at least one of the following: a particular time period in which the particular user is logged in to the real time messaging environment, a particular location in which the particular user is located, a particular device that the particular user is using, or a particular log-in that the particular user is using;

wherein the second situation is different than the first situation and indicates at least one of the following: a certain time period in which the particular user is logged in to the real time messaging environment, a certain location in which the particular user is located, a certain device that the particular user is using, or a certain log-in that the particular user is using;

providing an invisible state to a first user, wherein the invisible state indicates, to the first user, that the particular user is not available to communicate;

providing a visible state to a second user, wherein the visible state indicates, to the second user, that the particular user is available to communicate;

providing an invisible state to a third user, wherein the invisible state indicates, to the third user, that the particular user is not available to communicate; and providing a visible state to a fourth user, wherein the visible state indicates, to the fourth user, that the particular user is available to communicate;

wherein the third and fourth users are in the second set of users.

2. The method as recited in claim 1, wherein a third visibility profile, of the particular user, is associated with the invisible state associated with the third user.

3. The method as recited in claim 1, wherein a fourth visibility profile, of the particular user, is associated with the visible state associated with the fourth user.

4. The method as recited in claim 1, wherein the real time messaging environment comprises at least one of instant messaging communication, mobile device communication, or electronic mail communication.

5. The method as recited in claim 1, wherein the particular user is logged in as available to communicate.

6. The method as recited in claim 1, wherein the particular user is logged in as not available to communicate.

7. The method as recited in claim 1, further comprising:

when the particular user is in the first situation, allowing at least a subset of the users in the first set to view the particular user as available to communicate; and when the particular user is in the second situation, allowing at least a subset of the users in the second set to view the particular user as available to communicate.

8. A computer-readable storage medium storing instructions which, when executed by one or more processors, cause the one or more processors to perform the steps recited in claim 1.

9. A computer-readable storage medium storing instructions which, when executed by one or more processors, cause the one or more processors to perform the steps recited in claim 2.

10. A computer-readable storage medium storing instructions which, when executed by one or more processors, cause the one or more processors to perform the steps recited in claim 3.

11. A computer-readable storage medium storing instructions which, when executed by one or more processors, cause the one or more processors to perform the steps recited in claim 4.

12. A computer-readable storage medium storing instructions which, when executed by one or more processors, cause the one or more processors to perform the steps recited in claim 5.

13. A computer-readable storage medium storing instructions which, when executed by one or more processors, cause the one or more processors to perform the steps recited in claim 6.

14. A computer-readable storage medium storing instructions which, when executed by one or more processors, cause the one or more processors to perform the steps recited in claim 7.

* * * * *